(12) United States Patent
Poznanski et al.

(10) Patent No.: US 6,389,387 B1
(45) Date of Patent: May 14, 2002

(54) METHOD AND APPARATUS FOR MULTI-LANGUAGE INDEXING

(75) Inventors: Victor Poznanski, Sandford on Thames; Jan Jaap Ijdens, Gloucester Green, both of (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/321,016

(22) Filed: May 27, 1999

(30) Foreign Application Priority Data

Jun. 2, 1998 (GB) .............................................. 9811744

(51) Int. Cl.⁷ .............................................. G06F 17/27
(52) U.S. Cl. .......................................... 704/9; 707/536
(58) Field of Search ................... 704/1, 9, 10; 707/530, 707/531, 532, 536, 5

(56) References Cited

U.S. PATENT DOCUMENTS

| | | | |
|---|---|---|---|
| 5,301,109 A | * 4/1994 | Landuer et al. ................. | 704/9 |
| 5,708,829 A | * 1/1998 | Kadashevich et al. ......... | 704/9 |
| 5,778,361 A | * 7/1998 | Nanjo et al. .................... | 707/5 |
| 5,890,103 A | * 3/1999 | Carus ............................. | 704/9 |
| 5,956,740 A | * 9/1999 | Nosohara ..................... | 704/536 |
| 5,963,940 A | * 10/1999 | Liddy et al. ..................... | 707/5 |
| 5,983,171 A | * 11/1999 | Yokoyama et al. ............ | 704/9 |
| 6,006,221 A | * 12/1999 | Liddy et al. ..................... | 704/9 |
| 6,101,492 A | * 8/2000 | Jacquemin et al. ............ | 704/1 |

FOREIGN PATENT DOCUMENTS

| | | | |
|---|---|---|---|
| EP | 0 304 191 A2 | 2/1989 | ........... G06F/15/40 |
| EP | 0 813 160 A2 | 12/1997 | |
| WO | WO97/08604 A2 | 3/1997 | |

OTHER PUBLICATIONS

UK Search Report Dated Nov. 12, 1998.

* cited by examiner

Primary Examiner—Patrick N. Edouard
(74) Attorney, Agent, or Firm—Renner, Otto, Boisselle & Sklar

(57) ABSTRACT

A method for forming an index comprising indexing features for a plurality of documents, includes the steps of identifying each of at least some of the terms present in the documents, generating from each identified term at least one equivalent term which is different from but linguistically related to the identified term, forming for each of the identified terms a first indexing feature comprising the identified term and an identifier of the or each document in which the identified term occurs, forming for each of the equivalent terms a second indexing feature comprising the equivalent term and an identifier of the or each document in which the identifier term to which the equivalent term is equivalent occurs, and forming an index comprising the first and second indexing features.

27 Claims, 3 Drawing Sheets

METHOD AND APPARATUS FOR MULTI-LANGUAGE INDEXING

TECHNICAL FIELD OF THE INVENTION

The present invention relates to a method of and an apparatus for forming an index. The invention also relates to a storage medium storing a program for performing the method, an index, a storage medium containing the index and the use of the index to access documents.

The techniques disclosed herein may be used for information management. Examples of such applications include information retrieval systems, such as search engines, for accessing information on the internet or in office information systems, information filtering applications (also known as information routing systems) and information extraction applications.

DESCRIPTION OF THE RELATED ART

There are many data bases which contain documents in machine-readable form and which can be accessed to locate and retrieve information. Similarly, there are various known techniques for locating documents on the basis of subject matter. One example of this is the collection of published patent specifications. All patent specifications are indexed according to subject matter when the specification is published in accordance with the International Classification. The content of each patent specification is analyzed in accordance with the International Classification and the relevant classification numbers for the subject matter form part of the heading of both the printed patent specification and he machine-readable form.

In order to locate patent specifications, or indeed other documents, whose collections are similarly classified according to subject matter, it is necessary to select the correct international class and to apply this to a searching system. The searching system then locates all patent specifications which have been classified in the same class. However, a disadvantage of this system is that efficient use requires familiarity with and experience of using the International Classification system. Also, this technique relies on correct classification of patent specifications. Inexperienced use can result in relevant patent specifications being missed whereas incorrect classification can prevent a relevant patent specification from ever being located by this technique.

Another known technique for information retrieval relies on the selection of keywords which are then used to search for relevant documents such as patent specifications. In this case, it is necessary to identify words which are likely to appear in the relevant documents but which are unlikely to appear in irrelevant documents. Searching using keywords than reveals all documents which contain the keywords or combination of keywords.

There are several difficulties with this technique. For instance, in the case of subject matter without well-defined or stand terminology it may be difficult or impossible to select all keywords which might identify relevant documents. On the other hand, the use of more general keywords can lead to the disclosure of very large numbers of documents many of which are irrelevant. Further, such keywords can only be used for documents which are in the same language or which have been completely or partially translated or abstracted into the language of the keywords. The effectiveness of this technique in locating documents in other languages may therefore be poor or nonexistent.

D. A. Hull and G. Greffenstette, "Querying across languages: a Dictionary-Based Approach to Multilingual Information Retrieval", 19th Annual International Conference on Research and Development in Information Retrieval (SIGIR '96), pages 49–57, 1996 and D. W. Oard and B. J. Dorr, "A Survey of Multilingual Text Retrieval", Technical Report UMIACS-TR-96-19, University of Maryland, institute for Advanced Computer Studies, April 1996, disclose two techniques for performing multilingual information retrieval, one based on document translation and the other based on query translation. In each case, each translation is to be performed by a machine translation system. Thus, in the case of document translation, a machine translation system is used to translate all of a collection of documents into a target language so that queries for locating and retrieving information, for instance based on the keyword technique described hereinbefore, may be performed in the source (document) language or is the target language. In the other technique, the documents are not translated but each query is translated into the source or document language and the translations are used to search the document collection.

A disadvantage with query translation is that queries often comprise a few words and may not even be in a sentence context. Thus, automatic linguistic processing of such queries can be difficult and may lead to unsatisfactory results, such as failure to locate relevant documents and location of irrelevant documents.

The use of automatic machine translation to translate whole collections of documents to form an index is also problematic. The resources required in terms of computing time and additional storage medium capacity make this technique unattractive. Although such processing need not be performed in real time and, in particular, is not required as part of each information retrieval request, substantial resources are necessary and there may be a continuing requirement as further documents are added to the collection. Translation into several target languages multiplies the resource requirements.

Machine translation systems also perform tasks which are not useful to information retrieval and, in particular, to the forming of a multilingual index. For instance, in addition to translating words and groups of words contained in documents, machine translation systems also attempt to produce a good quality translation which is readable for human beings. If the translation is merely required for indexing, functions such as correct word ordering in the target language are unnecessary and are therefore wasteful of computing resources.

A further disadvantage with machine translation systems when used to translate documents into a target language for indexing purposes is that the effectiveness of the index may be seriously compromised. Some machine translation systems generate a single preferred translation of an input text. In other words, such systems attempt to identify and produce a single translation which is judged according to automatic criteria within the system as the best translation. If that translation is incorrect, then retrieval of information based on the incorrect translation will be ineffective because relevant documents may not be located and irrelevant documents may be located.

SUMMARY OF THE INVENTION

Other machine translation systems attempt to generate all possible translations of input text. Thus, even if the correct translation is present, there may be many other translations which are inappropriate or wrong. The use of such translations for information retrieval results in the generation of spurious matches on queries posed to the system so that very large numbers of irrelevant documents may be located together with the relevant documents.

According to a first aspect of the invention, there is provided a method of forming, for a plurality of documents, an index comprising indexing features, the method comprising the steps of:

identifying each of at least some of the terms present in the documents;

generating from each identified term at least one equivalent term which is different from but linguistically related to the identified term; and forming for each of the identified terms and the equivalent terms an indexing feature comprising the identified term or the equivalent term and an identifier of the or each document in which the identified term or the identified term to which the equivalent term is equivalent occurs.

The expression "term" used herein means an individual word, a group of linked words which occur adjacent each other in a document (continuous collocation), or a group of words which are led to each other but which are divided into at least two subgroups of words separated in a document by one or more words which are not members of the group (non-continuous collocations).

The expression "identifier" as used herein is any means for identifying one or more locations of a term, for instance a heading or arbitrary serial number of a document containing the term. The expression "indexing feature" as used herein means a term and an identifier.

The expression "linguistically related" as used herein means a term which has the same, a similar or related meaning. For instance, linguistically related terms include synonyms, more general terms and more specific terms in the same (natural) language and translations into a different (natural) language.

Although the documents may be in any type of language, such as a high level computer programming language, the documents are preferably natural language documents.

The generating step may comprise accessing a thesaurus with each identified term and the equivalent terms may be synonyms of the identified terms, more general terms than the identified terms and more specific terms than the identified terms.

The generating step may comprise accessing a multilingual resource with each identified term and the equivalent terms may be translations of the identified terms, more general terms than the identified terms and more specific terms than the identified terms.

The multilingual resource may comprise a glosser. The glosser may be a limited non-deterministic glosser. The glosser may form a plurality of translations of at least one of the identified terms and may assign to each translation a priority according to the likelihood of the translation being correct.

The multilingual resource may comprise a bilingual dictionary.

The multilingual resource may comprise a machine translation system.

The identifying step may be performed by a part of speech tagger.

According to a second aspect of the invention, there is provided an apparatus for forming, for a plurality of documents, an index comprising indexing features, the apparats comprising:

means for identifying each of at least some of the terms present in a document;

means for generating from each identified term at least one equivalent term which is different from but linguistically related to the identified term; and means for forming for each of the identified terms and the equivalent terms an indexing feature comprising the identified term or the equivalent term and an identifier of the or each document in which the identified term or the identified term to which the equivalent term is equivalent occurs.

The generating means may comprise a thesaurus and the equivalent terms may be synonyms of the identified terms, more general terms than the identified terms and more specific terms than the identified terms.

The identifying means and the generating means may comprise a multilingual resource.

The multilingual resource may comprise a glosser. The glosser may be a limited non-deterministic glosser. The glosser may be arranged to form a plurality of translations of at least one of the identified term and to assign to each translation a priority according to the likelihood of the translation being correct.

The multilingual resource may comprise a machine translation system.

The generating means may comprise a bilingual dictionary.

The identifying means may comprise a part of speech tagger.

The apparatus may comprise a programmed data processor.

According to a third aspect of the invention, there is provided a storage medium containing a program for controlling a data processor to perform a method according to the first aspect of the invention.

According to a fourth aspect of the invention, there is provided an index formed by a method according to the first aspect of the invention or by an apparatus according to the second aspect of the invention.

According to a fifth aspect of the invention, there is provided a storage medium containing an index according to the fourth aspect of the invention.

According to a sixth aspect of the invention, there is provided use of an index according to the fourth aspect of the invention to access the documents.

It is thus possible to form an index to a collection of documents having indexing features which are not restricted to the terms which occur in the documents. By making use of the thesaurus entries, synonymic, more general and more specific terms may be added to the index to increase the likelihood that an arbitrary query will locate a relevant document during information retrieval. By using multilingual resources, indexing may be performed in an efficient and effective manner in languages other than the source or document language.

Although any type of multilingual resource may be used, light-weight cross-linguistic glossing systems have advantages. Such a glossing system uses limited non-determinism to generate plausible target language translations to be used in indexing features, Such glossing systems or glossers may be of the type disclosed in EP 0 813 160 and GB 2 314 183, the contents of which are incorporated herein by reference. This type of glosser is capable of identifying and translating sequential (continuous) and non-sequential (non-continuous) collocations which are indexed by a headword. Further, this system can be used to ascribe priorities to alternative translations in such a way that consistent translations of complete sections of text are always obtained irrespective of which of several translations of a word or collocation is in fact selected. Further, the prioritising of alternative translations allows a limited number of such translations to be used, for instance based on the priority information.

Such glossers are more efficient than machine translation systems. An index merely requires the identification and translation of terms and does not require other processing steps such as parsing and generation of a readable translation as provided by machine translation systems. Thus, the use of glossing is computationally more efficient in that substantially less computational time is required.

The use of a glosser can overcome the problems associated with selection by a machine translation system of a single most likely, but perhaps incorrect, translation and the selection of all possible translations including those which are incorrect and may be entirely inappropriate for indexing purposes. By using nondeterministic techniques, a limited number of most likely translations of the terms can be provided. There is a very high probability that this limited number of translations selected from all possible translations will include the best or correct translation. Accordingly, accessing documents using indexes formed in this way provides a high probability of locating all relevant documents while reducing the numbers of irrelevant documents which might otherwise be located.

BRIEF DESCRIPTION OF THE DRAWINGS

The invention will be further described by way of example, with reference to the accompanying drawings, in which.

DETAILED DESCRIPTION OF THE INVENTION

Figure 1:
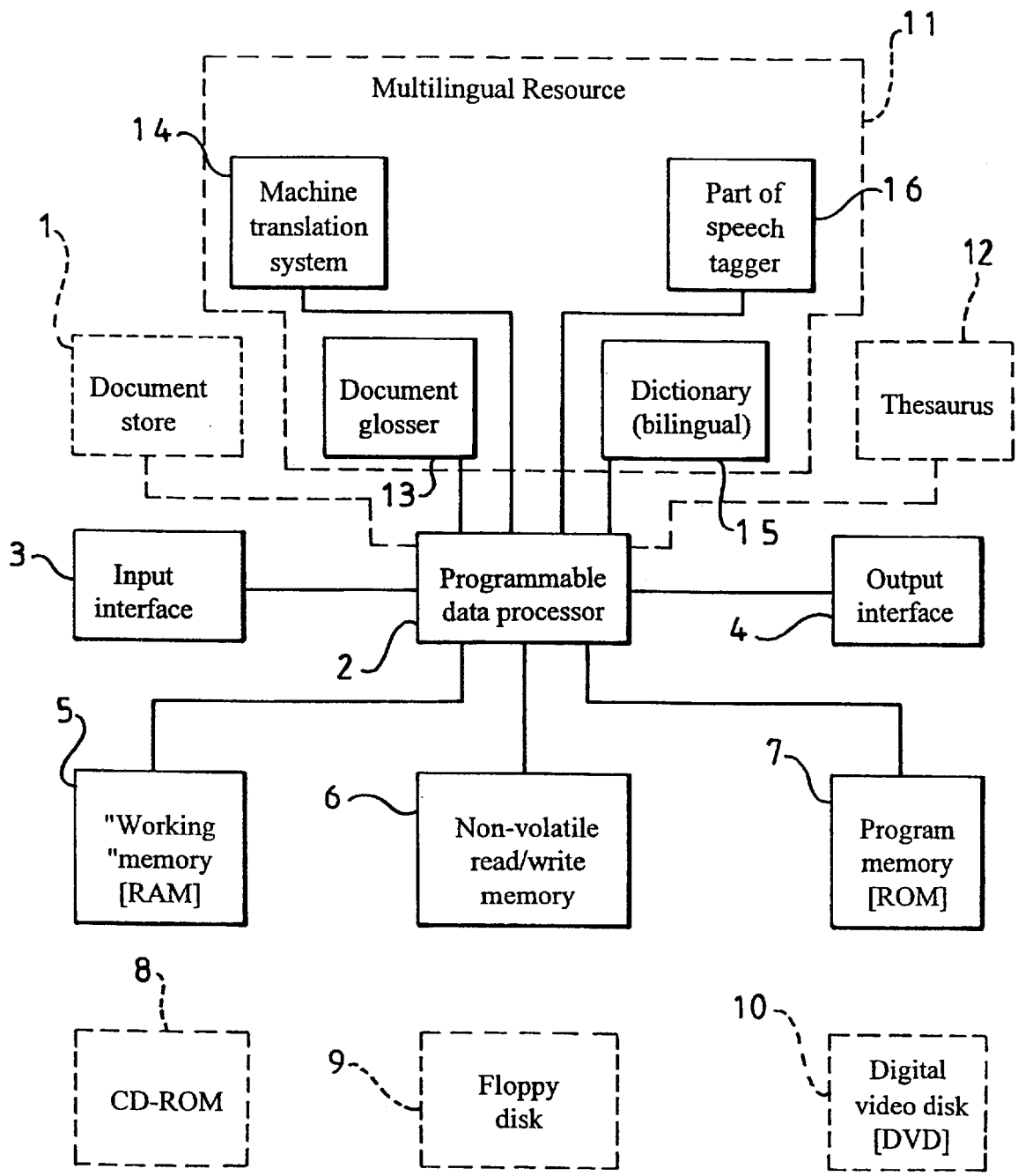
FIG. 1 is a block schematic diagram of an apparatus for forming an index constituting an embodiment of the invention.

FIG. 1 shows an apparatus for forming an index to a plurality of documents in machine-readable form stored in a document store 1, such as a magnetic disc or an optical storage medium such as a CD-ROM. The apparatus is of the programed data processor type, such as a computer, and comprises a programmable data processor 2 provided with an input interface 3, such as a keyboard and mouse, and an output interface 4, such as a display and printer. The data processor 2 has a "working memory" in the form of random access memory (RAM) 5 for temporarily storing data during data processing. A non-volatile read/write memory 6 is provided for storing data which are required to be retained, for instance, when the power supply to the apparatus is switched off. A program memory 7 in the form of a read-only memory (ROM) contains a program for controlling operation of the data processor 2.

The apparatus may also be provided with other memory devices. For instance, these may comprise suitable drives for CD-ROMs 8, floppy discs 9, and digital video discs (DVDs) 10. These devices may be of the read-only type or, for instance in the case of floppy discs 9, the read/write type. Such devices may provide the document store 1 and may provide an output medium for the apparatus. For instance, the index formed by the apparatus may be written to any of the storage media 8,9,10 shown in FIG. 1.

The program memory 7 contains the aforementioned program which is executed by the data processor 2 and/or the multilingual resource 11 and/or the thesaurus 12 in order to carry out the various operations described herein. The program may be written in any of a variety of known computer languages as will be readily apparent to those having ordinary skill in the art of computer programming. Hence, further detail regarding the specific code itself has been omitted for the sake of brevity.

A multilingual resource 11 and a machine-readable thesaurus 12 are shown as individual devices in FIG 1. However, these devices may be embodied within the components of the apparatus already described. For instance, any of the memories and devices 7 to 10 may contain the data and the memory 7 may contain programs for performing the operations of the multilingual resource and/or the thesaurus 12.

The multilingual resource 11 shows four resources which may be used during operation of the apparatus. A document glosser 13 is a "device" which labels an "ordered" plurality of source language words or collocations (groups of words) with target language translations. The glosser is preferably of the type which orders the translations of each word or collocation in order of likelihood of being the "correct" translation. This is preferably of the limited non-deterministic type, for instance as disclosed in EP 0 813 160 and GB 2 314 183.

Although the document glosser 13 is the preferred type of multilingual resource for the apparatus, other types of resource are illustrated in FIG. 1. Thus, the multilingual resource 11 may comprise a machine translation system 14. A suitable machine translation system is disclosed in W. John Hutchins and Harold L. Somers, "An Introduction to Machine Translation", Academic Press, 1992, ISBN 0-12-362830-X, the contents of which are incorporated herein by reference. A machine translation system performs deeper source language analysis than a glosser and also performs steps normally referred to as "generation", which attempts to put the target language translation of source language words or collocations into the correct grammatical order for the target language and to generate the correct inflections, etc. As described hereinbefore, such machine translation systems perform more processing and require more resources than a glosser but may be used as the multilingual resource 11 in appropriate circumstances.

The multilingual resource 11 may comprise a bilingual dictionary 15 of the machine-readable type. For instance, the source language text may not be processed but may simply be divided into words, and possibly collocations, which are then used to access the dictionary 15 to provide word-by-word translations of the text.

The multilingual resource 11 may comprise a part of speech tagger 16. Such a "device" performs limited grammatical analysis of the source language text to determine the part of speech of each word. The result of this limited analysis may then be applied to the bilingual dictionary 15 so as to provide an improved word-by-word translation than may be obtained by using the dictionary 15 alone.

Figure 2:
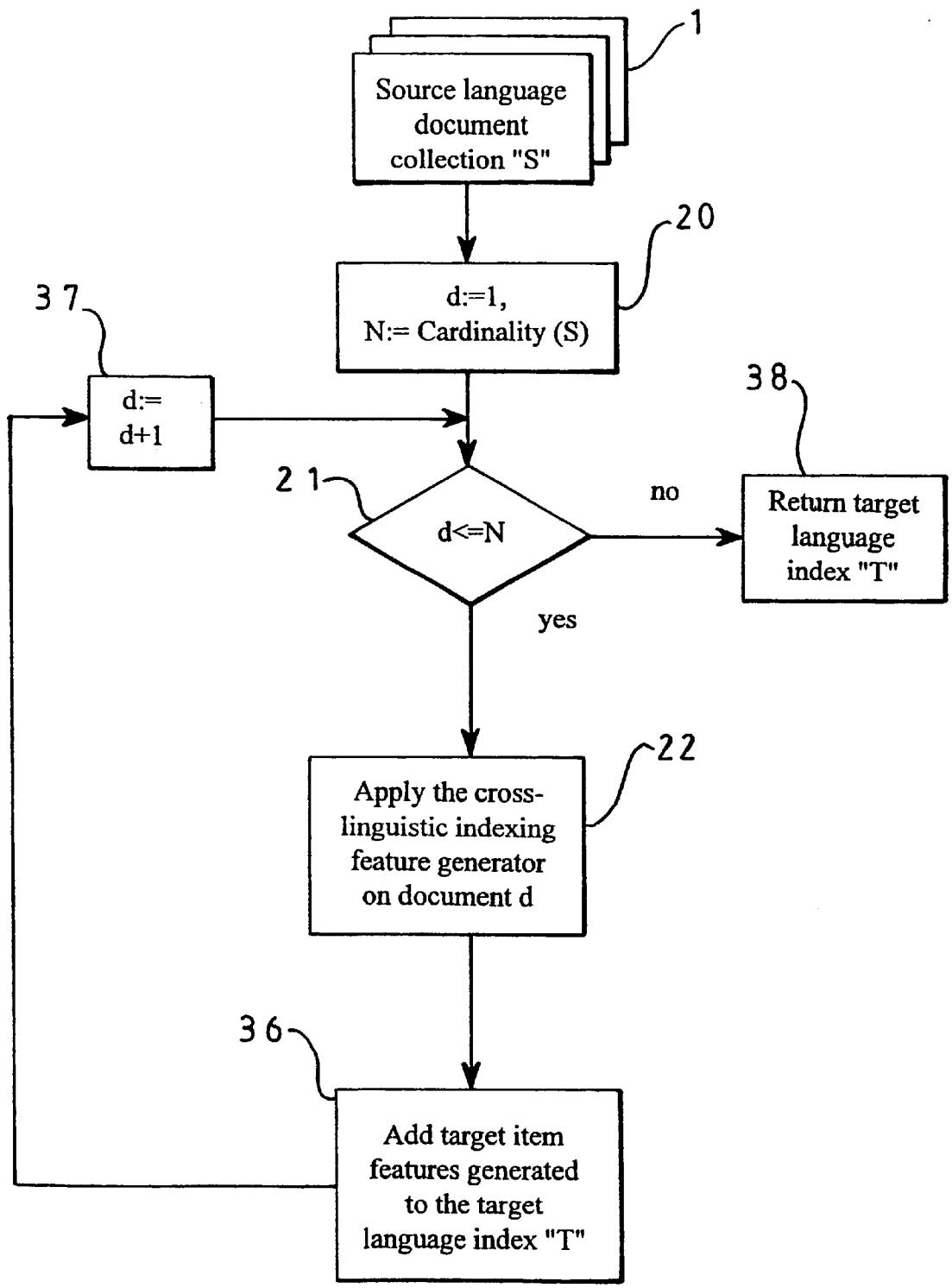
FIGS. 2 and 3 are flow diagrams illustrating a method of forming an index constituting an embodiment of the invention and performed by the apparatus shown in FIG. 1.
Figure 3:
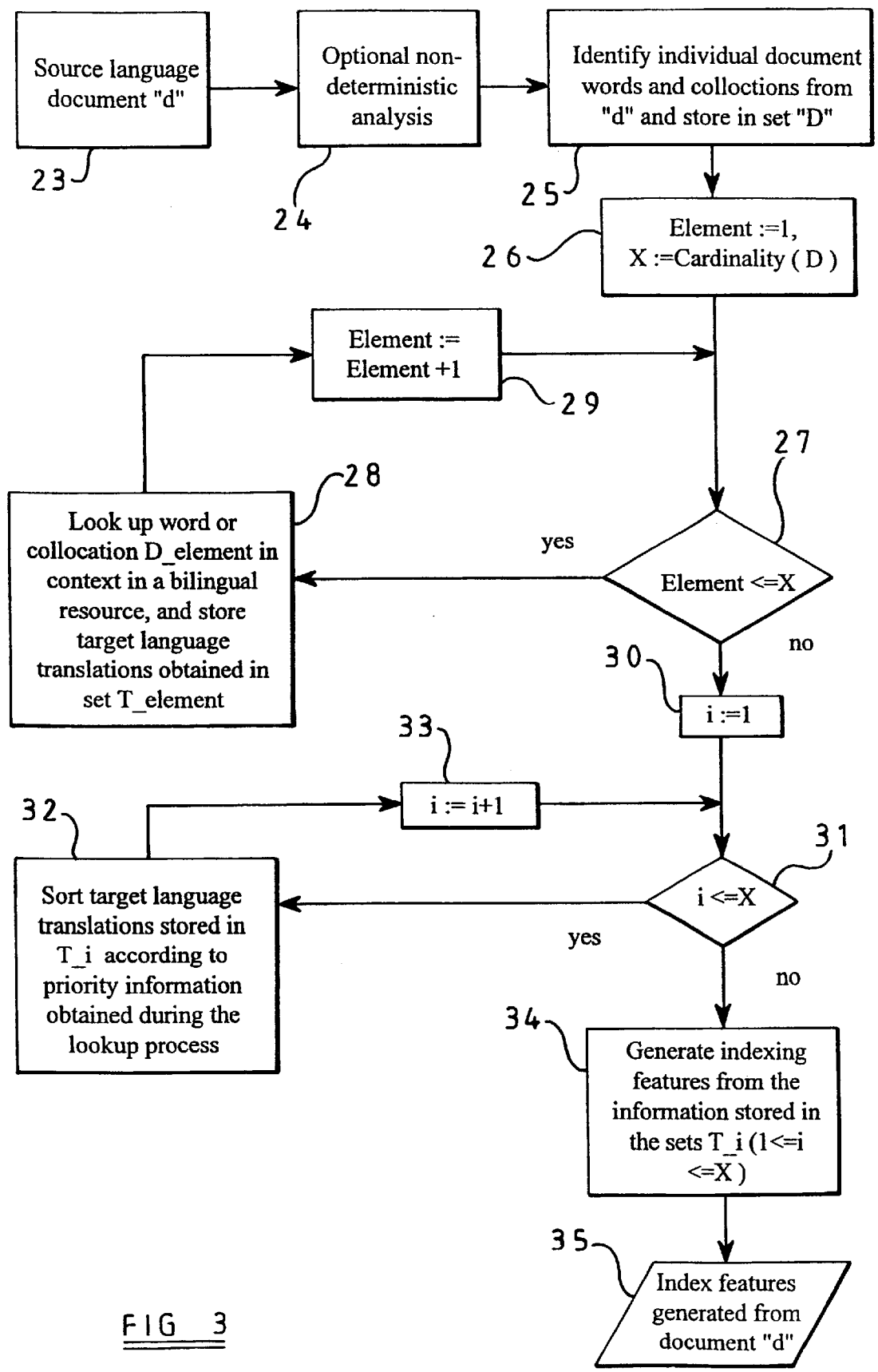

FIGS. 2 and 3 illustrate a method of forming an index which may be performed by the apparatus shown in FIG. 1. The document store 1 contains a collection S of documents in a source language such as a natural language. For the purpose of illustration only, operation will be described for the case where the documents of the collection S are in English and an English and Dutch index is required. However, the method may be used to provide a single-language index making use of the thesaurus 12 so as to provide indexing features based not only on words and collocations contained in the documents but also based on words and collocations in the same language derived from accessing the thesaurus 12 but not necessarily present in the documents.

In a step 20, a parameter "d" is set to a value of one and a parameter N is set equal to the cardinality of the document collection S i.e. to the number of documents in the collection. A step 21 tests whether "d" is less than or equal to N and, if so, performs a routine 22, which applies a cross-linguistic indexing feature generator on a document identified as "d"and which is shown in more detail in FIG. 3.

The source language document d is shown at 23 and is supplied to an "optional" non-deterministic analysis at a step 24 and then to a step 25, which identifies individual document words and collocations from the document d and stores them in a set D. The step 24 is performed in turn on each sentence of the document d and represents a non-deterministic analysis of the source language of the sentence. The analyzed sentence is passed to the step 25, which identifies individual words or collocations which potentially have translation equivalents in the target language. The steps 24 and 25 are performed by the document glosser 13.

In a step 26, a parameter "element" is set to a value of one and a parameter X is set to the value of the cardinality of the set D i.e. the number of words and collocations in the set D. A step 27 tests whether "element" is less than or equal to X and, if so, a step 28 is performed. In the step 28, the word or collocation identified as $D_{element}$ is looked up in a bilingual resource, such as the dictionary 15. Each of the possible translations obtained from the dictionary is stored in a set $T_{element}$. The context of the word or collocation is taken into account so as to ensure that the translations into the target language makes sense. For instance, this takes account of the possibility that certain decisions made about the translation of one part of a sentence may affect translations of other parts of the sentence.

In a step 29, the parameter element is incremented by one and the step 27 is performed again. This loop continues until all of the words and collocations in the set D have been translated, after which a step 30 is formed.

The step 30 sets a parameter i to a value of 1 and a step 31 tests whether i is less than or equal to X. If so, a step 32 sorts the target language translations stored in the set Ti according to priority information obtained during the step 28 from the bilingual dictionary. Thus, the step 32 provides a prioritising or ordering of each set of translations corresponding to a source language word or collocation. A technique for deriving such priority information is disclosed in EP 0 813 160 and GB 2 314 183.

A step 33 increments i by one and the step 31 is performed again. The loop continues until all target language translations have been sorted by the step 32, after which a step 34 generates indexing features from the information stored in the sets Ti for $1 \leq i \leq X$. In particular, the step 34 selects the most likely translations using the ordering generated in the step 32. The source words and collocations and the remaining target language translations are then arranged as indexing features by appending an identifier of the document d in which they were contained or from which they were derived. The resulting indexing features are shown diagrammatically at 35.

As shown in FIG. 2, the target language features are added to a target language index T in a step 36. The parameter d is incremented by one in a step 37 and the step 21 is performed again This procedure is repeated until all of the source language documents have been processed, at which point the target language index T is returned as shown at 38 together with the source language index to the output interface 4 and/or to any of the storage media 8, 9, 10.

A specific example to illustrate this method will now be described. In this specific example, the source language documents are in English and it is required to be able to access the documents in English or Dutch. The documents are therefore applied one at a time by the steps 20, 21 and 37 shown in FIG. 2 to the analysis shown in FIG. 3. For instance, the operation of the analysis illustrated in FIG. 3 will be described with reference to a document having an identifier number #8. Document #8 comprises English sentences which are analyzed one at a time. As an example, the following English sentence occurs it the document:

"air passes out of the furnace".

The analysis step 24 identifies that "air" could be a noun or verb, "passes" could be a plural noun or the third person of a verb etc. The step 25 identifies all words and collocations in the sentence to provide the following analysis.

air__NOUN
air__VERB
pass__VERB
pass__NOUN
pass__VERB out__PREP
out__PREP
out__PREP of__PREP
of__PREP
the__DET
furnace__NOUN The step 28 looks up the words and collocations in the bilingual dictionary or lexicon to derive Dutch translations as follows ("<none>" means that it is possible to give the word or collocation no translation):

| | | |
|---|---|---|
| air__NOUN | → | {lucht, hemel} |
| air__VERB | → | {luchten, uiten} |
| pass__VERB | → | {doorgeven, halen} |
| pass__VERB | → | {pas, kaart, voldoende} |
| pass__VERB out__PREP | → | {doorvoeren, flauwvallen} |
| out__PREP | → | {uit, buiten, extern van} |
| out__PREP of__PREP | → | (uit, buiten} |
| of__PREP | → | {<none>, van} |
| the__DET | → | {de, het} |
| furnace__NOUN | → | (oven, fomuis} |

The step 32 orders the target language translations in order of likelihood being correct and assigns them to the input sentence as follows:

| | | |
|---|---|---|
| air | → | [lucht, luchten, hemel, uiten] |
| pass | → | [doorvoeren, doorgeven, pas, kart, voldoende, halen, flauwvallen] |
| out | → | [uit, buiten, extern van] |
| of | → | [<none>, van] |
| the | → | [de, het] |
| furnace | → | [oven, fomuis] |

The step 34 generates the indexing features by applying the limited non-determinism i.e. selecting the most likely translations, and associating the source language words and collocations and the target language translations with the identifier (#8) of the document currently being analyzed as follows:

("air",#8)
("lucht",#8)
("luchten",#8)

("doorvoeren",#8)
("pass",#8)
("doorgeven",#8)
("pas",#8)
("kaart",#8)
("out of",#8)
("de",#8)
("het",#8)
("furnace",#8)
("oven",#8)

Once all of the documents have been analyzed in this way, the final index is provided, for example in a storage medium, and is of the following form:

| ["aardvark"] | → | #1, #17, #21, #47, #109 |
|---|---|---|
| ["air"] | → | #5, #8, #87 |
| ... | ... | ... |
| ["out of"] | → | #8, #10 |
| ... | ... | ... |
| ["doorvoeren"] | → | #1, #8, #79 |
| ... | ... | ... |
| ["zebra"] | → | #9, #10, #94, #187 |

Accordingly, when it is desired to retrieve information from the document collection, queries in either English or Dutch may be applied to the index by means of an information retrieval system. These queries may be in the form of words or collocations related to the subject matter to be searched. The information retrieval system applies these to the index and, if matches with the indexing features are found, the relevant document number or numbers are returned so as to identify the document or documents which are likely to contain the subject matter of interest.

What is claimed is:

1. A method for forming an index comprising indexing features for a plurality of documents, comprising data-processing apparatus implemented steps of:
    identifying each of at least some of the terms present in the documents;
    generating from each identified term at least one equivalent term which is different from but linguistically related to the identified term;
    forming for each of the identified terms a first indexing feature comprising the identified term and an identifier of the or each document in which the identified term occurs;
    forming for each of the equivalent terms a second indexing feature comprising the equivalent term and an identifier of the or each document in which the identified term to which the equivalent term is equivalent occurs; and
    forming an index comprising the first and second indexing features,
    wherein the documents are natural language documents in a source language, the at least one equivalent term is a natural language translation of the corresponding identified term in the source language to the equivalent term in a target language different from the source language, and the forming steps include forming the first and second indexing features for the identified term in the source language and the equivalent term in the target language, respectively.

2. A method according to claim 1, wherein the documents are natural language documents.

3. A method according to claim 1, wherein the generating step comprises accessing a thesaurus with each identified term and the equivalent terms are synonyms of the identified terms, more general terms than the identified terms and more specific terms than the identified terms.

4. A method according to claim 1, wherein the generating step comprises accessing a multilingual resource with each identified term and the equivalent terms are translations of: the identified terms; more general terms than the identified terms; and more specific terms than the identified terms.

5. A method according claim 4, wherein the multilingual resource comprises a glosser.

6. A method according to claim 5, wherein the glosser is a limited non-deterministic glosser.

7. A method according to claim 6, wherein the glosser forms a plurality of translations of at least one of the identified terms and assigns to each translation a priority according to the likelihood of the translation being correct.

8. A method according to claim 4, wherein the multilingual resource comprises a bilingual dictionary.

9. A method according to claim 4, wherein the multilingual resource comprises a machine translation system.

10. A method according to claim 1, wherein the identifying step is performed by a part of speech tagger.

11. A method according to claim 1, further comprising the step of applying a query to the index by means of an information retrieval system, the query including terms in at least one of the source language and the target language.

12. A method according to claim 11, wherein the query includes terms in the source language and the target language.

13. A data-processing apparatus for forming an index comprising indexing features for a plurality of documents, comprising:
    means for identifying each of at least some of the terms present in the documents;
    means for generating from each identified term at least one equivalent term which is different from but linguistically related to the identified term;
    means for forming for each of the identified terms a first indexing feature comprising the identified term and an identifier of the or each document in which the identified term occurs;
    means for forming for each of the equivalent terms a second indexing feature comprising the equivalent term and an identifier of the or each document in which the identified term to which the equivalent term is equivalent occurs; and
    means for forming an index comprising the first and second indexing features,
    wherein the documents are natural language documents in a source language, the at least one equivalent term is a natural language translation of the corresponding identified term in the source language to the equivalent term in a target language different from the source language, and the forming steps include forming the first and second indexing features for the identified term in the source language and the equivalent term in the target language, respectively.

14. An apparatus according to claim 13, wherein the documents are natural language documents.

15. An apparatus according to claim 13, wherein the generating means comprises a thesaurus and the equivalent terms are synonyms of the identified terms, more general terms than the identified terms and more specific terms than the identified terms.

16. An apparatus according to claim 13, wherein the identifying means and the generating means comprise a multilingual resource.

17. An apparatus according to claim 16, wherein the multilingual resource comprises a glosser.

18. An apparatus according to claim 17, wherein the glosser is a limited non-deterministic glosser.

19. An apparatus according to claim 18, wherein the glosser is arranged to form a plurality of translations of at least one of the identified terms and to assign to each translation a priority according to the likelihood of the translation being correct.

20. An apparatus according to claim 16, wherein the multilingual resource comprises a machine translation system.

21. An apparatus according to claim 13, wherein the generating means comprises a bilingual dictionary.

22. An apparatus according to claim 13, wherein the identifying means comprises a part of speech tagger.

23. An apparatus according to claim 13, further comprising a programmed data processor.

24. A storage medium containing a program for controlling a data processor to perform a method for forming an index comprising indexing features for a plurality of documents, the method comprising the steps of:
  identifying each of at least some of the terms present in the documents;
  generating from each identified term at least one equivalent term which is different from but linguistically related to the identified term;
  forming for each of the identified terms a first indexing feature comprising the identified term and an identifier of the or each document in which the identified term occurs;
  forming for each of the equivalent terms a second indexing feature comprising the equivalent term and an identifier of the or each document in which the identified term to which the equivalent term is equivalent occurs; and
  forming an index comprising the first and second indexing features,
  wherein the documents are natural language documents in a source language, the at least one equivalent term is a natural language translation of the corresponding identified term in the source language to the equivalent term in a target language different from the source language, and the forming steps include forming the first and second indexing features for the identified term in the source language and the equivalent term in the target language, respectively.

25. An index comprising indexing features for a plurality of documents, the index formed by a method comprising data-processing apparatus implemented steps of:
  identifying each of at least some of the terms present in the documents;
  generating from each identified term at least one equivalent term which is different from but linguistically related to the identified term;
  forming for each of the identified terms a first indexing feature comprising the identified term and an identifier of the or each document in which the identified term occurs;
  forming for each of the equivalent terms a second indexing feature comprising the equivalent term and an identifier of the or each document in which the identified term to which the equivalent term is equivalent occurs; and
  forming an index comprising the first and second indexing features,
  wherein the documents are natural language documents in a source language, the at least one equivalent term is a natural language translation of the corresponding identified term in the source language to the equivalent term in a target language different from the source language, and the forming steps include forming the first and second indexing features for the identified term in the source language and the equivalent term in the target language, respectively.

26. A storage medium containing an index comprising indexing features for a plurality of documents, the index formed by a method comprising the steps of:
  identifying each of at least some of the terms present in the documents;
  generating from each identified term at least one equivalent term which is different from but linguistically related to the identified term;
  forming for each of the identified terms a first indexing feature comprising the identified term and an identifier of the or each document in which the identified term occurs;
  forming for each of the equivalent terms a second indexing feature comprising the equivalent term and an identifier of the or each document in which the identified term to which the equivalent term is equivalent occurs; and
  forming an index comprising the first and second indexing features,
  wherein the documents are natural language documents in a source language, the at least one equivalent term is a natural language translation of the corresponding identified term in the source language to the equivalent term in a target language different from the source language, and the forming steps include forming the first and second indexing features for the identified term in the source language and the equivalent term in the target language, respectively.

27. A method for accessing documents comprising data processing apparatus implemented steps of:
  forming an index by:
    identifying each of at least some of the terms present in the documents;
    generating from each identified term at least one equivalent term which is different from but linguistically related to the identified term;
    forming for each of the identified terms a first indexing feature comprising the identified term and an identifier of the or each document in which the identified term occurs;
    forming for each of the equivalent terms a second indexing feature comprising the equivalent term and an identifier of the or each document in which the identified term to which the equivalent term is equivalent occurs;
    forming an index comprising the first and second indexing features; and
  accessing the documents by using the index,
  wherein the documents are natural language documents in a source language, the at least one equivalent term is a natural language translation of the corresponding identified term in the source language to the equivalent term in a target language different from the source language, and the forming steps include forming the first and second indexing features for the identified term in the source language and the equivalent term in the target language, respectively.

* * * * *